US005987729A

United States Patent [19]

Moran

[11] Patent Number: 5,987,729

[45] **Date of Patent: *Nov. 23, 1999**

[54] MULTIPLE PLENUM SUCTION HOLD DOWN DEVICE

[76] Inventor: Thomas F. Moran, 65 Hastings La., Chagrin Falls, Ohio 44022

[ * ] Notice: Under 35 U.S.C. 154(b), the term of this patent shall be extended for 675 days.

[21] Appl. No.: 08/570,835

[22] Filed: Dec. 12, 1995

Related U.S. Application Data

[63] Continuation of application No. 08/265,007, Jun. 24, 1994, abandoned.

[51] Int. Cl.[6] .......... B23Q 7/00

[52] U.S. Cl. .......... 29/559; 269/21

[58] Field of Search .......... 29/559; 269/21; 279/3; 408/76

[56] References Cited

U.S. PATENT DOCUMENTS

| | | | |
|---|---|---|---|
| 2,782,574 | 2/1957 | Copold | 269/21 X |
| 3,307,818 | 3/1967 | Cocito | 269/21 X |
| 4,795,518 | 1/1989 | Meinel et al. | 269/21 X |
| 5,222,719 | 6/1993 | Effner | 269/21 |
| 5,323,821 | 6/1994 | Suzuki | 269/21 X |
| 5,346,193 | 9/1994 | Kitagawa | 269/21 |

FOREIGN PATENT DOCUMENTS

| | | | |
|---|---|---|---|
| 148 023 | 5/1981 | Germany | 269/21 |
| 3208864 | 9/1983 | Germany | 269/21 |
| 63-245341 | 10/1988 | Japan | 269/21 |
| 92/10336 | 6/1992 | WIPO | 269/21 |
| 93/22104 | 11/1993 | WIPO | 269/21 |

*Primary Examiner*—David P. Bryant

*Attorney, Agent, or Firm*—Rankin, Hill, Porter & Clark LLP

[57] ABSTRACT

A holddown device is disclosed for use with a automatic machine tool, such as a CNC router. The holddown device comprises a flat box having a hollow interior forming a reduced pressure chamber therein and having a planar work surface for placement of workpieces to be engaged by the machine tool. The chamber formed in the interior of the box is connected to an air evacuation device which is capable of moving large volumes of air. A plurality of plenums substantially cover the planar work surface. Holes within each plenum extend through the work surface into the chamber to provide fluid connection between the interior of the box and each of the plenums, whereby the partial vacuum is created in the plenums. The partial vacuum in the plenums serving to hold down the workpieces positioned on the work surface. The holddown device provides a flexible and universally applicable system for holding down workpieces on the machining center, eliminating set up time, and allowing machine time to be used for productivity.

10 Claims, 3 Drawing Sheets

MULTIPLE PLENUM SUCTION HOLD DOWN DEVICE

This is a continuation of application Ser. No. 08/265,007, filed Jun. 24, 1994, now abandoned.

BACKGROUND OF THE INVENTION

1. Field of the Invention

This invention relates to automatic machine tools, and more particularly to devices used in association with machine tools to hold down workpieces on the work surface to permit machining operations to be performed on the workpieces.

2. Description of the Prior Art

Computer numeric control (CNC) machining centers provide versatile machine tool movement on multiple axes for the cutting and machining a variety of materials, such as plastic, wood, poured composites such as DuPont Corian, laminated materials, aluminum and steel. A common and widely used application for CNC equipment is to automatically move router cutting and milling heads horizontally at speeds exceeding 100 inches per minute while simultaneously plunging the spinning router cutting tip, which typically is ¼ inches in diameter, vertically downwardly into a workpiece. These machines are often called "CNC routers." The resultant cutting action when combined with motion and speed instructions from the numeric control produces cut patterns of a given configuration based upon a computer program.

The router cutting heads are moved automatically on an horizontal x axis and are plunged simultaneously vertically downwardly along a z axis into the workpiece. Since the workpiece could also move horizontally away from the router heads along the x axis and could move horizontally sideways along a y axis, the workpiece is clamped to the work surface by mechanical means or through specialized vacuum arrangement.

The cutting heads can have a straight cutting tool or complex shaped cutting tool leaving the cut edge of the workpiece with square edges, curved edges, complex edges or a combination thereof. Using this method and apparatus, the product cut from the original workpiece can be of an infinite variety of shapes, sizes and thicknesses. The product can be made in multiples or in individual cuts, producing components that, when assembled together, then result in cabinets, enclosures, boxes or other geometric shapes.

Some typical applications of the assembled work pieces are wood kitchen cabinets, furniture pieces or plastic enclosures and cabinets for electrical and electronic controls.

The CNC router allows for high speed and repeatability in tool path direction, within a tolerance of about 0.0025 inches. As improved tool cutting technology combines with faster tool movement through improved CNC technology, and computer technology provides more sophisticated programming capabilities, improvement in productivity results. In particular, computer programming facilitate rapid design changes.

A limiting factor to high production on existing CNC routers is the "set up" time required to affix the workpiece to the machine work surface. If a vacuum arrangement is used to hold down the workpiece, a gasketing system duplicating the shape of the finished cut piece is required, and this gasketing system must be created for each set up. If a mechanical clamping means is used, problems exist when the clamps interfere with tool movement over the workpiece. In either case, valuable programming and production time is lost in "setting up" to run each job.

SUMMARY OF THE INVENTION

The present invention overcomes these difficulties and provides advantages in making products using CNC routers and other automated machining centers. The invention provides a flexible and universally applicable system for holding down workpieces on the machining center, eliminating set up time, and allowing machine time to be used for productivity.

The holddown device of the present invention allows for high production of precision machining of products made of plastic, wood and other materials. Using the holddown device of this invention, the need to create specialized hold down gaskets is eliminated, and set up requirements are substantially eliminated.

Because the holddown device of this invention can be used in a wide variety of applications, the placement and utilization of workpieces is not limited by the design of a specialized holddown gasket. The invention thus allows for flexibility in workpiece sizes and placement and increases sheet utilization. Since fixed set up considerations are eliminated, the present invention creates design and programming freedom.

The holddown device of the present invention allows for extremely flexible operation of the automated machine tools such as CNC routers. It accommodates a variety of tool configurations, feed rates and cutting depths. It works on various surface textures. It is indiscriminate to material type, color, thickness or surface texture. It handles solid or laminate, composite, thermoplastic or thermoset materials.

The present invention allows the use of CNC routers to be extended into cutting shapes and sizes and random multiples in a cost-effective manner, providing significant advantages over the prior art methods and apparatus in which set up programming and set up times were often were considerably longer than the production programming and production runs.

The present invention provides direct cost reductions from better raw material utilization, elimination of set up time, extended tool life, design simplicity, faster programming, and user/operator friendly machine operation.

These and other advantages are provided by the present invention of a holddown device for use with a machine tool. The holddown device comprises a flat box having a hollow interior forming a chamber therein and having a planar work surface for placement of workpieces to be engaged by the machine tool. A plurality of contiguous plenums substantially cover the entire planar work surface. Means are provided for reducing the air pressure within the chamber formed in the interior of the box. There are also means for providing fluid connection between the chamber and each of the plenums, whereby the partial vacuum is created in the plenums, the partial vacuum in the plenums serving to hold down the workpieces positioned on the work surface.

DETAILED DESCRIPTION OF THE PREFERRED EMBODIMENT

Figure 1:
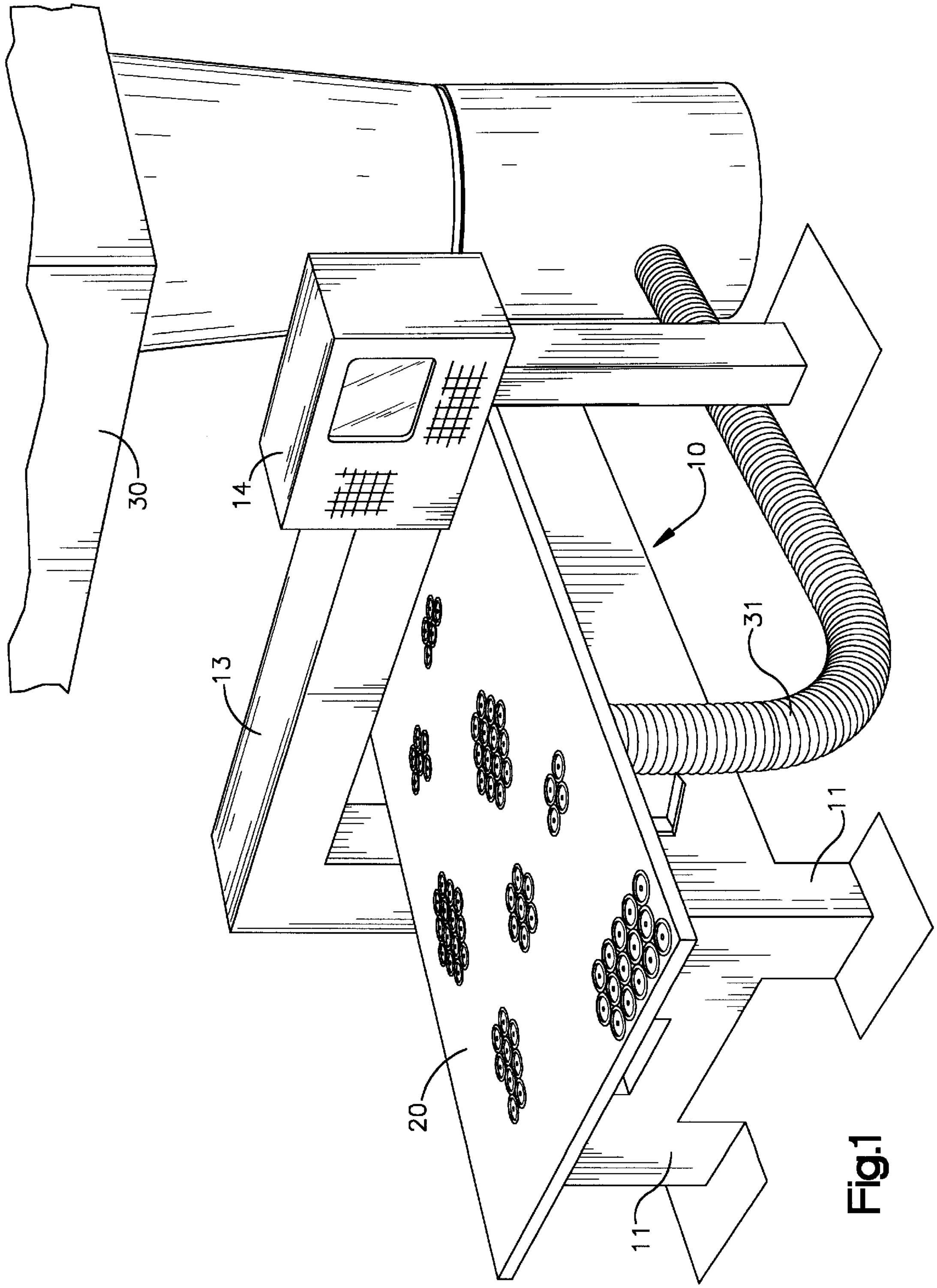
FIG. 1 is a perspective view of CNC router having the holddown device of the present invention.

Referring more particularly to the drawings and initially to FIG. 1, there is shown a typical CNC router 10. Although the invention is shown in conjunction with a CNC router, it should be understood that the application of the invention is not limited to the use with this particular machine and that the machine has application and advantages with various types of machine tools as well as other devices.

The CNC router 10 has a support frame comprising legs 11 supporting a platen 12. The cutting tools are mounted on a tool bridge 13 extending over the platen 12. The operation of the CNC router 10 is controlled from a console 14 located adjacent to the platen 12. The console 14 typically includes a visual display and a keypad for various controls for operating the CNC router 10, usually in accordance with a computer program that is downloaded into the console from a CAD-CAM station. The CNC router 10 operates on workpieces positioned on the platen 12. The typical dimensions of a single platen machine may be 4 feet wide and 8 feet long. In accordance with the prior art, the workpieces on the platen 12 were held down with clamps or with a specially made fixture which held down the workpieces using a vacuum arrangement.

In accordance with this invention a unique holddown device 20 is used with the CNC router 10. The holddown device 20 is essentially a large, hollow, flat box 21 which is mounted on the platen 12. Typical dimensions of the box 21 may be 2 inches deep, 4 feet wide and 8 feet long. The width and length of the box 21 may be whatever is required by the work surface of the CNC router 10.

The box 21 is hollow forming a large chamber 22 inside. The internal construction of the hollow box 21 can be seen with reference to FIG. 2. The top surface of the box 21 extends parallel to and spaced above the platen 12 of the CNC router 10. The top surface of the box 21, which provides the work surface for the CNC router 10, is formed by a jig plate 23 which is preferably constructed of a ½ inch thick aluminum jig plate to insure a flat work surface. The bottom of the box 21 is formed by the top surface of the platen 12. The jig plate 23 is supported on the platen 12 by a plurality of support angles 24 extending across the width of the holddown device 20. The angles 24 may be, for example, 2 inches high by 2 inches wide, ¼ inches thick and spaced 8 inches apart. The angles 24 are affixed to the platen 12, and the jig plate 23 is secured to the angles 24, for example, by machine screws every 6 inches.

The sides of the holddown box 21 are formed by side rails 25 extending downwardly from the perimeter of the jig plate 23. The bottoms of the side rails 25 are affixed to the platen 12, and the tops of the rails are attached to the jig plate 23. The side rails 25 may be, for example ½ inch by 2 inch aluminum rails affixed to the platen 12 with machine screws and sealed, and attached to the jig plate 23 with machine screws every 6 inches and sealed. In the illustrated embodiment just described with a 4 foot by 8 foot work surface with angles 24 spaced every 8 inches, a series of 12 separate smaller chamber portions would be formed within the interior of box 21. To prevent these separate chamber portions from becoming isolated from each other and from the air evacuation device, a plurality of openings 26 are formed in the angles 24. The openings 26 permit the air flow in each chamber portion to communicate with adjacent chamber portions and allow unobstructed air flow throughout the larger chamber 22 formed within the entire interior of the holddown device. The openings 26 may be, for example, 1 inch in diameter and centered every 6 to 8 inches in the upright side of each angle 24.

The chamber 22 formed in the interior of the holddown box 21 is connected to an air evacuation device 30 through a flexible pipe or tube 31. The tube 31 may be, for example 4 inches in diameter. The tube 31 may be connected to the holddown device anywhere on the underside, but the connection location should be positioned so that it does not interfere with the movement of the platen 12 in the direction of the y axis. The preferred location of the connection is midway along the length of the box 21 to allow maximum efficiency of the air flow from the chamber 22 to the evacuation device 30. A valve 32 is provided in the tube 31 to allow the air evacuation device to be turned on and off.

Figure 2:
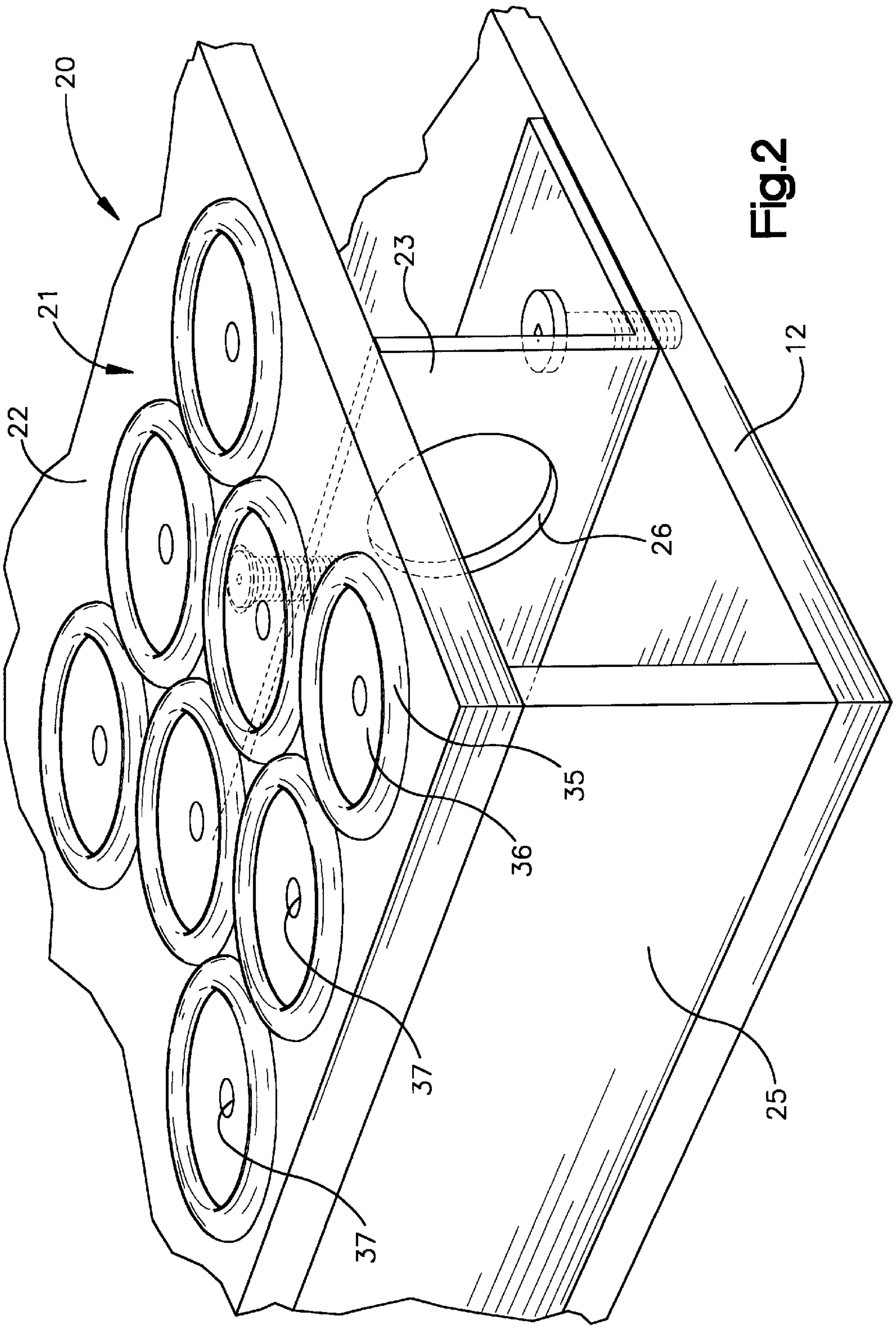
FIG. 2 is another perspective view of the holddown device of FIG. 1 to a larger scale.
Figure 3:
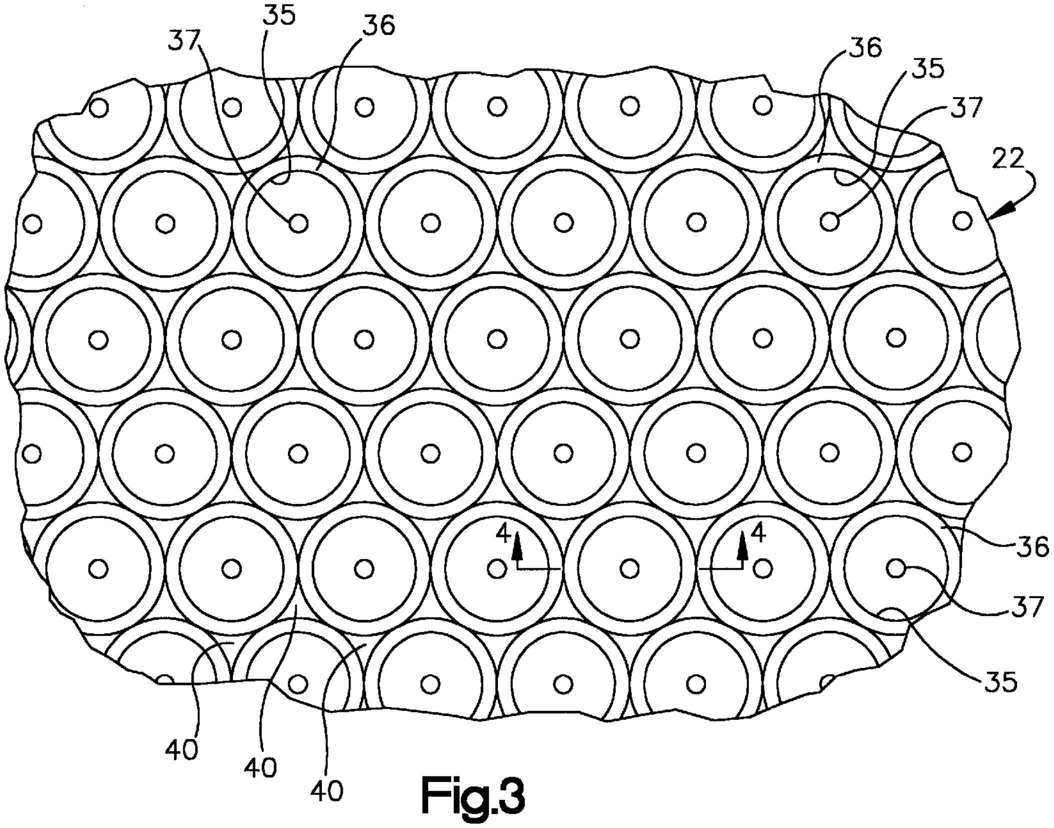
FIG. 3 is a top plan view of the upper surface of the holddown device showing the arrangement of the O ring plenums.

As shown in FIGS. 2 and 3, a plurality of adjacent and staggered ring grooves 35 is machined into the top surface of the jig plate 23. Each of the ring grooves 35 as a circular cross section to receive and hold a sealing member in the form of an O ring 36. A hole 37 is drilled through the jig plate 23 in the center of each ring groove 35 to connect the space within the O ring 36 to the reduced pressure chamber 22 formed in the interior of the box 21. The space inside each ring groove 35 thus becomes a small vacuum plenum, with the partial vacuum being drawn through the hole 37 communicating with the chamber 22 formed in the interior of the box 21, and the plenum being sealed around the sides by the O ring 36 and being sealed on top by the workpiece placed upon the holddown device.

Each of the O rings 36 is preferably a suitable neoprene O ring. Suitable O rings may be obtained by CCB Seal Company, and manufactured by Parker.

Each of the O rings 36 is slightly larger in dimension that the ring groove 35 into which it fits, so the O rings fit tightly with the ring groove to avoid accidental removal. For example, each of the O rings 36 may have an inside diameter of 1 inch and a cross sectional diameter of 0.134 inches. The ring groove 35 would then each have an inside diameter of 1.005 inches and a cross sectional diameter of 0.129 inches. Each of the ring grooves 35 would then be 0.005 inches smaller in cross section than each of the O rings 36, so that the O rings must be pressed into the ring grooves. Each O ring 36 is then squeezed and compressed to keep it from accidentally falling out of the ring groove 35. The inside diameter of the ring groove 35 at 1.005 inches is 0.005 inches larger in diameter than the 1 inch inside diameter O ring 36 inserted into it. This causes the 1 inch inside diameter O ring 36 to be "stretched" 0.005 inches as it is placed into the ring groove 35. This contributes further to preventing accidental removal of the O rings 36 from the ring grooves 35.

Figure 4:
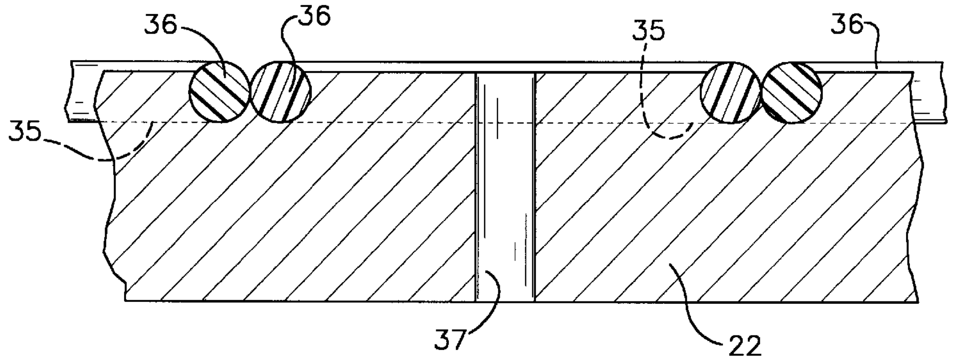
FIG. 4 is a side sectional view taken along line 4—4 of FIG. 3.

As shown in FIG. 4, the ring grooves 35 are more shallow than the cross sectional diameter of the O ring 36 inserted into the ring groove so that the O ring projects slightly above the top surface of the jig plate 23. For example, for O rings having a cross section of 0.129 inches, the ring grooves 35 are preferably machined 0.104 inches deep into the top surface of the jig plate 23. The top of the O rings 36 then rest at 0.020 above the top surface of the jig plate 23.

The holes 37 function as air passages through which the air can pass to create a partial vacuum within the plenum formed inside the O ring 36. The angles 24 supporting the jig plate 23 are positioned so that they do not interfere with the location of the holes 37. The machine screws holding the jig plate 23 to the angles 24 are positioned inside the diameter of the O ring 36 but do not interfere with the holes 37. For the 1 inch diameter O rings discussed above, the hole 37 that is drilled at the center of each ring groove is preferably 0.125 inches in diameter in order to maintain enough air flow to sufficiently reduce the pressure and create a partial vacuum.

The ring grooves 35 are machined in a contiguous array with each ring groove (except those around the periphery of the array) abutting six adjacent ring grooves around it as shown in FIG. 3 to maximize the surface of the jig plate 23 that is within one of the vacuum plenums. This arrangement provides the maximum number of ring grooves 35 on the top surface of the jig plate 23. For example, a holddown device having a work surface of 4 feet by 8 feet would have more than 5,000 ring grooves (each having a 1.005 inch diameter) using this layout. The 5,000 O-rings inserted into these ring grooves offer significant resistance to lateral movement of the workpiece. Other arrangements may be used for the ring grooves, but the arrangement disclosed herein is preferred because it provides the most effective positioning of the vacuum plenums formed within the ring grooves 35.

The only portions of the top surface of the jig plate 23 that do not provide a vacuum plenum are the small triangular areas 40 formed between three adjacent ring grooves. By using the arrangement of ring grooves illustrated and described herein, the space occupied by these small triangular areas 40 is minimized.

It is also preferred that the adjacent ring grooves 35 are connected to each other, so that adjacent O rings 36 abut each other. This prevents the small triangular areas 40 from being interconnected and providing a larger connected surface area which is not subjected to the vacuum plenum. By isolating each of the small triangular areas 40 and preventing their interconnection, the effect of a lack of any vacuum effect in these small triangular areas is minimized.

The air evacuation device 30 is a regenerative blower. A suitable blower may be obtained from Becker Pump Company. The blower is connected to the tube 31 which in turn is connected up to the bottom of the holddown box 21. One of the features of this invention is the use of a blower which moves relatively large volumes of air, instead of a pump device which is designed primarily to create a positive vacuum. The regenerative blower preferably moves air at a minimum of more than 500 cubic feet per minute (cfm). The Becker Pump Company regenerative blower provides air flow of 550 cfm. Using a regenerative blower of this capacity with a 4 foot by 8 foot holddown device creates a partial vacuum of more than 10 inches of mercury within the chamber 22 formed in the interior of the box, and this reduced air pressure is more than sufficient to provide suitable forces on the top of the holddown device to firmly grip workpieces. In fact the higher the cfm, the better the performance. Multiple blowers can be connected to the plenum.

By using a high volume or high cfm device as the air evacuation device instead of a vacuum pump, the hold down device is less effected by the number of holes 37 that remain uncovered when the workpiece is placed on the top surface of the jig plate 23. It has been found that a device made according to the present invention with a high cfm blower can provide a partial vacuum of 11 inches of mercury within the chamber 22 formed in the interior of the box when all the holes 37 are covered and can provide the same partial vacuum of 11 inches of mercury with 300 holes open. On the other hand, if a vacuum pump were used, a partial vacuum of 28 inches of mercury could be formed in the chamber 22 when all the holes 37 were covered, but the pressure would drop to 0 inches of mercury (i.e., effectively no vacuum) when only one hole was opened.

When a workpiece is placed on the top surface of the jig plate 23, and the blower is turned on, the spaces within each of the O rings 36 now serve as vacuum plenums. As the cutting tool of the CNC router 10 cuts through the workpiece exposing some of the vacuum plenums to atmosphere, the remaining plenums continue to hold down the workpiece.

In accordance with prior art holddown devices, if the vacuum plenum was exposed to atmosphere, the vacuum would be lost, and the workpiece could move. With the holddown device of the present invention, a workpiece as small as 3 inches square by ¼ inches thick can be operated upon without losing sufficient air pressure to cause the workpiece to move. Using a 4 foot by 8 foot work surface having 5,000 O rings, a regenerative blower having a capacity of 500 cfm has the capacity to overcome as many as 8% of the O rings exposed to atmosphere while maintaining sufficient vacuum within the remaining O rings covered by the workpiece.

The multiplicity of O rings 36 also creates friction and combines with the suction of the reduced air pressure to create resistance to the horizontal forces generated by the cutting tool of the CNC router 10 as the workpiece and cutting tools move to create cut shapes. The suction produced by the holddown device 20 is also sufficient to keep the workpiece from "riding" up or pulling on a multiple flute spiral router tool (the spirals being provided on the tool for chip removal). The suction forces also flatten warped sheets, allowing more accurate machining.

As the cutting tool of the CNC router 10 moves horizontally cutting a path through the workpiece, it ideally touches the top of the O rings 36 which project slightly above the top surface of the jig plate 23, the O rings extending 0.020 inches above the top surface in the example given above. If the cutting tool cuts into the O rings 36 as may occur due to expected tolerances in the flatness of the jig plate 23, the O rings 36 can be replaced in the course of routine preventive maintenance. The O rings 36 projecting above the top surface of the jig plate 23 causes the jig plate surface to be protected from damage from the cutting tool even if the cutting tool extends through the workpiece by as much as 0.020 inches. Cutting tool life is thereby increased since the cutting tool does not engage the aluminum jig plate. Experience with the holddown device of this invention has, however, shown that O ring damage is minimal and that O ring replacement is rarely needed. As the cutting tool moves along the tool path opening some of the vacuum plenums to atmosphere, the remaining unopened plenums maintain a partial vacuum and hold the workpiece securely on the work surface.

Unlike the specially fabricated gaskets of the prior art, the holddown device of this invention adapts to any shape being cut without the need for set up. A machine operator need only to place the workpiece on the work surface of the holddown device, and any design or shape can be cut without regard for holding down the workpiece in any particular area. The suction needed to hold down the workpieces exists everywhere on the work surface in the form of the vacuum plenums formed with the O rings, and each plenum is protected from the vagaries of the others.

The holddown device 20 of this invention may also be used as part of a combination vacuum forming device and CNC router. In vacuum forming, after a product has been formed from a thermoplastic sheet, a "trim" operation is performed on a CNC router. In the prior art, the product must be first be formed and then fixed to the work surface using a traditional specially created vacuum gasket vacuum or using mechanical clamps. Using the holddown device of this invention, the object can be vacuum formed on the hold-down device itself whereupon the automated trim operation can be preformed by the CNC router in a single operation. This procedure completely eliminates an entire step in the manufacturing operation and consolidates vacuum forming and trimming into one operation.

While the box 21 shown in the preferred embodiment uses the top surface of the platen 12 to form the bottom of the box, the box may also be formed with its own bottom plate so that the holddown device may be made portable and may be readily mounted to existing machines.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way this is inconsistent with the extent to which the progress in the art has been advanced by the invention.

What is claimed is:

1. A holddown device for use with a machine tool, comprising:

- a flat box having a hollow interior forming a chamber and having a rigid planar work surface for placement of workpieces to be engaged by the machine tool;
- a plurality of toroidal rings positioned in an array within corresponding grooves formed in the planar work surface, each of the grooves having a partial toroidal profile, each of the rings being substantially identical, a plurality of substantially identical plenums being formed on the work surface within each of the rings, each of the plenums having outer sides and a bottom, the outer sides of each of the plenums being formed by the interior of one of the toroidal rings, the bottom of each of the plenums being formed by the planar work surface, each of the rings within an outer periphery of rings abutting six adjacent rings to form a continuous pattern of rings, the plenums occupying substantially the entire work surface;
- means for removing air from the chamber in the interior of the box at a rate of more than 500 cfm; and
- an opening within the bottom of each of the plenums extending through the planar work surface into the interior of the box to provide a fluid connection directly between the plenums and the interior, whereby a partial vacuum is created in the plenums, the partial vacuum in the plenums serving to hold down the workpieces positioned on the work surface.

2. A holddown device as set forth in claim 1, wherein each of the rings extends above the planar work surface.

3. A holddown device as set forth in claim 1, wherein each of the rings include friction means for resisting lateral movement of the workpieces on the work surface.

4. A holddown device as set forth in claim 1, wherein all of the openings are permanently open.

5. A holddown device as set forth in claim 1, wherein adjacent grooves are connected, and adjacent rings abut each other.

6. A holddown device as set forth in claim 1, wherein the air removing means is a regenerative blower which moves air at more than 500 cfm.

7. A holddown device as set forth in claim 1, wherein the plurality of rings comprise periphery rings located around the periphery of the work surface and interior rings located within the periphery rings, each of the interior rings abutting six other rings so as to maximize the portion of the work surface occupied by the plenums.

8. A method for holding down workpieces for operations by a machine tool, comprising the steps of:

- providing a flat box having a hollow interior and having a rigid planar work surface with a plurality of toroidal rings positioned within corresponding grooves formed in the planar work surface, each of the grooves having a partial toroidal profile, each of the rings being substantially identical, a plurality of substantially identical plenums being formed on the work surface within each of the rings, each of the plenums having outer sides and a bottom, the outer sides of each of the plenums being formed by the interior of one of the toroidal rings, the bottom of each of the plenums being formed entirely by the planar work surface, each of the rings within an outer periphery of rings abutting six adjacent rings to form a continuous pattern of rings, the plenums occupying substantially the entire work surface;
- placing the workpieces on the planar work surface;
- providing fluid connection directly between the chamber and each of the plenums through the work surface without going through the rings;
- removing air from the chamber formed in the interior of the box at a rate of more than 500 cfm to create a partial vacuum in the plenums; and
- using the partial vacuum in the plenums to hold down the workpieces positioned on the work surface so that they can be engaged by the machine tool, while allowing plenums not covered by the workpieces to remain open.

9. A method for holding down workpieces as set forth in claim 8, wherein air is removed by using a regenerative blower which moves air at more than 500 cfm.

10. A method for holding down workpieces as set forth in claim 8, wherein a fluid connection is provided by providing a hole within each the plenums extending through the planar work surface directly into the chamber formed in the interior of the box, and wherein all of the holes are left open.

* * * * *